United States Patent
Chen et al.

(10) Patent No.: US 6,775,318 B2
(45) Date of Patent: Aug. 10, 2004

(54) METHOD AND APPARATUS FOR CODE GROUP IDENTIFICATION AND FRAME SYNCHRONIZATION IN DS/CDMA SYSTEMS

(75) Inventors: Po-Tsun Chen, Hsinchu (TW); Ho-Chi Hwang, Hsinchu Hsien (TW); Yun-Yen Chen, Kaohsiung (TW); Muh-Rong Yang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 735 days.

(21) Appl. No.: 09/735,492

(22) Filed: Dec. 14, 2000

(65) Prior Publication Data

US 2002/0064211 A1 May 30, 2002

(30) Foreign Application Priority Data

Aug. 30, 2000  (TW) ...................................... 89117569 A (51) Int. Cl.⁷ ........................ H04L 27/30; H04B 7/212
(52) U.S. Cl. ...................... 375/149; 375/147; 375/148; 375/150; 375/151; 375/152; 375/343; 375/350; 375/371; 370/324
(58) Field of Search ................................ 375/147–152, 375/343, 350, 371; 370/324, 342, 509

(56) References Cited

U.S. PATENT DOCUMENTS 5,930,366 A  *  7/1999  Jamal et al. ................. 370/509
6,185,244 B1  *  2/2001  Nystrom et al. ............ 375/145
6,665,277 B1  *  12/2003  Sriram ....................... 370/324

FOREIGN PATENT DOCUMENTS

EP    930723 A  *  7/1999  .......... H04B/1/707

* cited by examiner

Primary Examiner—Edith Chang
(74) Attorney, Agent, or Firm—Birch, Stewart, Kolasch & Birch, LLP (57) ABSTRACT

The present invention provides an apparatus and method for code group identification and frame synchronization for cell searching used in wide-band DS-CDMA cellular systems. This method characterizes each secondary synchronization code sequence (SSCS) with a corresponding theoretical frequency sequence, which represents the occurrence times of $CS_1$ to $CS_{16}$ in a corresponding SSCS. Thus, 64 secondary synchronization code sequences corresponding to 64 code groups defined in DS-CDMA systems also corresponds to 64 theoretical frequency sequences. By characterizing the SSCS transmitted by a base station, a real frequency sequence can be generated. Comparing the real frequency sequence with the 64 theoretical frequency sequences, one can determine one or two candidate code groups, which may be employed by the base station. Finally, one can compare the SSCS transmitted by the base station with all the possible SSCSs corresponding to the candidate code groups to determine a specific code group and a frame boundary for the base station.

7 Claims, 11 Drawing Sheets

FIG. 1 (PRIOR ART)

| Scrambling code group | Slot number | | | | | | | | | | | | | | |
|---|---|---|---|---|---|---|---|---|---|---|---|---|---|---|---|
| | #1 | #2 | #3 | #4 | #5 | #6 | #7 | #8 | #9 | #10 | #11 | #12 | #13 | #14 | #15 |
| code group 1 | 1 | 1 | 2 | 8 | 9 | 10 | 15 | 8 | 10 | 16 | 2 | 7 | 15 | 7 | 16 |
| code group 2 | 1 | 1 | 5 | 16 | 7 | 3 | 14 | 16 | 3 | 10 | 5 | 12 | 14 | 12 | 10 |
| code group 3 | 1 | 2 | 1 | 15 | 5 | 5 | 12 | 16 | 6 | 11 | 2 | 16 | 11 | 15 | 12 |
| code group 4 | 1 | 2 | 3 | 1 | 8 | 6 | 5 | 2 | 5 | 8 | 4 | 4 | 6 | 3 | 7 |
| code group 5 | 1 | 2 | 16 | 6 | 6 | 11 | 15 | 5 | 12 | 1 | 15 | 12 | 16 | 11 | 2 |
| code group 6 | 1 | 3 | 4 | 7 | 4 | 1 | 5 | 5 | 3 | 6 | 2 | 8 | 7 | 6 | 8 |
| code group 7 | 1 | 4 | 11 | 3 | 4 | 10 | 9 | 2 | 11 | 2 | 10 | 12 | 12 | 9 | 3 |
| code group 8 | 1 | 5 | 6 | 6 | 14 | 9 | 10 | 2 | 13 | 9 | 2 | 5 | 14 | 1 | 13 |
| code group 9 | 1 | 6 | 10 | 10 | 4 | 11 | 7 | 13 | 16 | 11 | 13 | 6 | 4 | 1 | 16 |
| code group 10 | 1 | 6 | 13 | 2 | 14 | 2 | 6 | 5 | 5 | 13 | 10 | 9 | 1 | 14 | 10 |
| code group 11 | 1 | 7 | 8 | 5 | 7 | 2 | 4 | 3 | 8 | 3 | 2 | 6 | 6 | 4 | 5 |
| code group 12 | 1 | 7 | 10 | 9 | 16 | 7 | 9 | 15 | 1 | 8 | 16 | 8 | 15 | 2 | 2 |
| code group 13 | 1 | 8 | 12 | 9 | 9 | 4 | 13 | 16 | 5 | 1 | 13 | 5 | 12 | 4 | 8 |
| code group 14 | 1 | 8 | 14 | 10 | 14 | 1 | 15 | 15 | 8 | 5 | 11 | 4 | 10 | 5 | 4 |
| code group 15 | 1 | 9 | 2 | 15 | 15 | 16 | 10 | 7 | 8 | 1 | 10 | 8 | 2 | 16 | 9 |
| code group 16 | 1 | 9 | 15 | 6 | 16 | 2 | 13 | 14 | 10 | 11 | 7 | 4 | 5 | 12 | 3 |
| code group 17 | 1 | 10 | 9 | 11 | 15 | 7 | 6 | 4 | 16 | 5 | 2 | 12 | 13 | 3 | 14 |
| code group 18 | 1 | 11 | 14 | 4 | 13 | 2 | 9 | 10 | 12 | 16 | 8 | 5 | 3 | 15 | 6 |
| code group 19 | 1 | 12 | 12 | 13 | 14 | 7 | 2 | 8 | 14 | 2 | 1 | 13 | 11 | 8 | 11 |
| code group 20 | 1 | 12 | 15 | 5 | 4 | 14 | 3 | 16 | 7 | 8 | 6 | 2 | 10 | 11 | 13 |
| code group 21 | 1 | 15 | 4 | 3 | 7 | 6 | 10 | 13 | 12 | 5 | 14 | 16 | 8 | 2 | 11 |
| code group 22 | 1 | 16 | 3 | 12 | 11 | 9 | 13 | 5 | 8 | 2 | 14 | 7 | 4 | 10 | 15 |
| code group 23 | 2 | 2 | 5 | 10 | 16 | 11 | 3 | 10 | 11 | 8 | 5 | 13 | 3 | 13 | 8 |
| code group 24 | 2 | 2 | 12 | 3 | 15 | 5 | 8 | 3 | 5 | 14 | 12 | 9 | 8 | 9 | 14 |
| code group 25 | 2 | 3 | 6 | 16 | 12 | 16 | 3 | 13 | 13 | 6 | 7 | 9 | 2 | 12 | 7 |
| code group 26 | 2 | 3 | 8 | 2 | 9 | 15 | 14 | 3 | 14 | 9 | 5 | 5 | 15 | 8 | 12 |
| code group 27 | 2 | 4 | 7 | 9 | 5 | 4 | 9 | 11 | 2 | 14 | 5 | 14 | 11 | 16 | 16 |
| code group 28 | 2 | 4 | 13 | 12 | 12 | 7 | 15 | 10 | 5 | 2 | 15 | 5 | 13 | 7 | 4 |
| code group 29 | 2 | 5 | 9 | 9 | 3 | 12 | 8 | 14 | 15 | 12 | 14 | 5 | 3 | 2 | 15 |
| code group 30 | 2 | 5 | 11 | 7 | 2 | 11 | 9 | 4 | 16 | 7 | 16 | 9 | 14 | 14 | 4 |
| code group 31 | 2 | 6 | 2 | 13 | 3 | 3 | 12 | 9 | 7 | 16 | 6 | 9 | 16 | 13 | 12 |
| code group 32 | 2 | 6 | 9 | 7 | 7 | 16 | 13 | 2 | 12 | 2 | 13 | 12 | 9 | 16 | 6 |
| code group 33 | 2 | 7 | 12 | 15 | 2 | 12 | 4 | 10 | 13 | 15 | 13 | 4 | 5 | 5 | 10 |
| code group 34 | 2 | 7 | 14 | 16 | 5 | 9 | 2 | 9 | 16 | 11 | 11 | 5 | 7 | 4 | 14 |
| code group 35 | 2 | 8 | 5 | 12 | 5 | 2 | 14 | 14 | 8 | 15 | 3 | 9 | 12 | 15 | 9 |
| code group 36 | 2 | 9 | 13 | 4 | 2 | 13 | 8 | 11 | 6 | 4 | 6 | 8 | 15 | 15 | 11 |
| code group 37 | 2 | 10 | 3 | 2 | 13 | 16 | 8 | 10 | 8 | 13 | 11 | 11 | 16 | 3 | 5 |
| code group 38 | 2 | 11 | 15 | 3 | 11 | 6 | 14 | 10 | 15 | 10 | 6 | 7 | 7 | 14 | 3 |
| code group 39 | 2 | 16 | 4 | 5 | 16 | 14 | 7 | 11 | 4 | 11 | 14 | 9 | 9 | 7 | 5 |

FIG. 2A (PRIOR ART)

| code group 40 | 3 | 3 | 4 | 6 | 11 | 12 | 13 | 6 | 12 | 14 | 4 | 5 | 13 | 5 | 14 |
|---|---|---|---|---|---|---|---|---|---|---|---|---|---|---|---|
| code group 41 | 3 | 3 | 6 | 5 | 16 | 9 | 15 | 5 | 9 | 10 | 6 | 4 | 15 | 4 | 10 |
| code group 42 | 3 | 4 | 5 | 14 | 4 | 6 | 12 | 13 | 5 | 13 | 6 | 11 | 11 | 12 | 14 |
| code group 43 | 3 | 4 | 9 | 16 | 10 | 4 | 16 | 15 | 3 | 5 | 10 | 5 | 15 | 6 | 6 |
| code group 44 | 3 | 4 | 16 | 10 | 5 | 10 | 4 | 9 | 9 | 16 | 15 | 6 | 3 | 5 | 15 |
| code group 45 | 3 | 5 | 12 | 11 | 14 | 5 | 11 | 13 | 3 | 6 | 14 | 6 | 13 | 4 | 4 |
| code group 46 | 3 | 6 | 4 | 10 | 6 | 5 | 9 | 15 | 4 | 15 | 5 | 16 | 16 | 9 | 10 |
| code group 47 | 3 | 7 | 8 | 8 | 16 | 11 | 12 | 4 | 15 | 11 | 4 | 7 | 16 | 3 | 15 |
| code group 48 | 3 | 7 | 16 | 11 | 4 | 15 | 3 | 15 | 11 | 12 | 12 | 4 | 7 | 8 | 16 |
| code group 49 | 3 | 8 | 7 | 15 | 4 | 8 | 15 | 12 | 3 | 16 | 4 | 16 | 12 | 11 | 11 |
| code group 50 | 3 | 8 | 15 | 4 | 16 | 4 | 8 | 7 | 7 | 15 | 12 | 11 | 3 | 16 | 12 |
| code group 51 | 3 | 10 | 10 | 15 | 16 | 5 | 4 | 6 | 16 | 4 | 3 | 15 | 9 | 6 | 9 |
| code group 52 | 3 | 13 | 11 | 5 | 4 | 12 | 4 | 11 | 6 | 6 | 5 | 3 | 14 | 13 | 12 |
| code group 53 | 3 | 14 | 7 | 9 | 14 | 10 | 13 | 8 | 7 | 8 | 10 | 4 | 4 | 13 | 9 |
| code group 54 | 5 | 5 | 8 | 14 | 16 | 13 | 6 | 14 | 13 | 7 | 8 | 15 | 6 | 15 | 7 |
| code group 55 | 5 | 6 | 11 | 7 | 10 | 8 | 5 | 8 | 7 | 12 | 12 | 10 | 6 | 9 | 11 |
| code group 56 | 5 | 6 | 13 | 8 | 13 | 5 | 7 | 7 | 6 | 16 | 14 | 15 | 8 | 16 | 15 |
| code group 57 | 5 | 7 | 9 | 10 | 7 | 11 | 6 | 12 | 9 | 12 | 11 | 8 | 8 | 6 | 10 |
| code group 58 | 5 | 9 | 6 | 8 | 10 | 9 | 8 | 12 | 5 | 11 | 10 | 11 | 12 | 7 | 7 |
| code group 59 | 5 | 10 | 10 | 12 | 8 | 11 | 9 | 7 | 8 | 9 | 5 | 12 | 6 | 7 | 6 |
| code group 60 | 5 | 10 | 12 | 6 | 5 | 12 | 8 | 9 | 7 | 6 | 7 | 8 | 11 | 11 | 9 |
| code group 61 | 5 | 13 | 15 | 15 | 14 | 8 | 6 | 7 | 16 | 8 | 7 | 13 | 14 | 5 | 16 |
| code group 62 | 9 | 10 | 13 | 10 | 11 | 15 | 15 | 9 | 16 | 12 | 14 | 13 | 16 | 14 | 11 |
| code group 63 | 9 | 11 | 12 | 15 | 12 | 9 | 13 | 13 | 11 | 14 | 10 | 16 | 15 | 14 | 16 |
| code group 64 | 9 | 12 | 10 | 15 | 13 | 14 | 9 | 14 | 15 | 11 | 11 | 13 | 12 | 16 | 10 |

| Scrambling code group | Occurrence times for 16 secondary synchronization codes | | | | | | | | | | | | | | | |
|---|---|---|---|---|---|---|---|---|---|---|---|---|---|---|---|---|
| | $CS_1$ | $CS_2$ | $CS_3$ | $CS_4$ | $CS_5$ | $CS_6$ | $CS_7$ | $CS_8$ | $CS_9$ | $CS_{10}$ | $CS_{11}$ | $CS_{12}$ | $CS_{13}$ | $CS_{14}$ | $CS_{15}$ | $CS_{16}$ |
| code group 1 | 2 | 2 | 0 | 0 | 0 | 0 | 2 | 2 | 1 | 2 | 0 | 0 | 0 | 0 | 2 | 2 |
| code group 2 | 2 | 0 | 2 | 0 | 2 | 0 | 1 | 0 | 0 | 2 | 0 | 2 | 0 | 2 | 0 | 2 |
| code group 3 | 2 | 2 | 0 | 0 | 2 | 1 | 0 | 0 | 0 | 0 | 2 | 2 | 0 | 0 | 2 | 2 |
| code group 4 | 2 | 2 | 2 | 2 | 2 | 2 | 1 | 2 | 0 | 0 | 0 | 0 | 0 | 0 | 0 | 0 |
| code group 5 | 2 | 2 | 0 | 0 | 1 | 2 | 0 | 0 | 0 | 0 | 2 | 2 | 0 | 0 | 2 | 2 |
| code group 6 | 2 | 1 | 2 | 2 | 2 | 2 | 2 | 2 | 0 | 0 | 0 | 0 | 0 | 0 | 0 | 0 |
| code group 7 | 1 | 2 | 2 | 2 | 0 | 0 | 0 | 0 | 2 | 2 | 2 | 2 | 0 | 0 | 0 | 0 |
| code group 8 | 2 | 2 | 0 | 0 | 2 | 2 | 0 | 0 | 2 | 1 | 0 | 0 | 2 | 2 | 0 | 0 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| code group 63 | 0 | 0 | 0 | 0 | 0 | 0 | 0 | 0 | 2 | 1 | 2 | 2 | 2 | 2 | 2 | 2 |
| code group 64 | 0 | 0 | 0 | 0 | 0 | 0 | 0 | 0 | 2 | 2 | 2 | 2 | 2 | 2 | 2 | 1 |

| Scrambling code group | Encoded occurrence times for 16 secondary synchronization codes | | | | | | | | | | | | | | | |
|---|---|---|---|---|---|---|---|---|---|---|---|---|---|---|---|---|
| | $CS_1$ | $CS_2$ | $CS_3$ | $CS_4$ | $CS_5$ | $CS_6$ | $CS_7$ | $CS_8$ | $CS_9$ | $CS_{10}$ | $CS_{11}$ | $CS_{12}$ | $CS_{13}$ | $CS_{14}$ | $CS_{15}$ | $CS_{16}$ |
| code group 1 | 11 | 11 | 00 | 00 | 00 | 00 | 11 | 11 | 01 | 11 | 00 | 00 | 00 | 00 | 11 | 11 |
| code group 2 | 11 | 00 | 11 | 00 | 11 | 00 | 01 | 00 | 00 | 11 | 00 | 11 | 00 | 11 | 00 | 11 |
| code group 3 | 11 | 11 | 00 | 00 | 11 | 01 | 00 | 00 | 00 | 00 | 11 | 11 | 00 | 00 | 11 | 11 |
| code group 4 | 11 | 11 | 11 | 11 | 11 | 11 | 01 | 11 | 00 | 00 | 00 | 00 | 00 | 00 | 00 | 00 |
| code group 5 | 11 | 11 | 00 | 00 | 01 | 11 | 00 | 00 | 00 | 00 | 11 | 11 | 00 | 00 | 11 | 11 |
| code group 6 | 11 | 01 | 11 | 11 | 11 | 11 | 11 | 11 | 00 | 00 | 00 | 00 | 00 | 00 | 00 | 00 |
| code group 7 | 01 | 11 | 11 | 11 | 00 | 00 | 00 | 00 | 11 | 11 | 11 | 11 | 00 | 00 | 00 | 00 |
| code group 8 | 11 | 11 | 00 | 00 | 11 | 11 | 00 | 00 | 11 | 01 | 00 | 00 | 11 | 11 | 00 | 00 |
| . | . | . | . | . | . | . | . | . | . | . | . | . | . | . | . | . |
| code group 63 | 00 | 00 | 00 | 00 | 00 | 00 | 00 | 00 | 11 | 01 | 11 | 11 | 11 | 11 | 11 | 11 |
| code group 64 | 00 | 00 | 00 | 00 | 00 | 00 | 00 | 00 | 11 | 11 | 11 | 11 | 11 | 11 | 11 | 01 |

METHOD AND APPARATUS FOR CODE GROUP IDENTIFICATION AND FRAME SYNCHRONIZATION IN DS/CDMA SYSTEMS

BACKGROUND OF THE INVENTION

1. Field of the Invention

The present invention generally relates to an apparatus and method for code group identification and frame synchronization used in direct-sequence code division multiple access (DS-CDMA) communication systems, such as wide-band CDMA systems and $3^{rd}$ generation partnership project (3GPP) system.

2. Description of the Related Art

Currently, DS-CDMA cellular systems are classified as inter-cell synchronous systems with precise inter-cell synchronization and asynchronous systems without it. For inter-cell synchronous systems, an identical long code is assigned to each base station, but with a different time offset. The initial cell search can be executed by performing timing acquisition of the long code. The search for a peripheral cell on hand-offs can be carried out quickly because the mobile station can receive the offset information of the long code for the peripheral base station from the current base station. However, each base station requires a highly-time consistent apparatus, such as the global position system (GPS) and rubidium backup oscillators. Moreover, it is difficult to deploy GPS in basements or other locations RF signals cannot easily reach.

Figure 1:
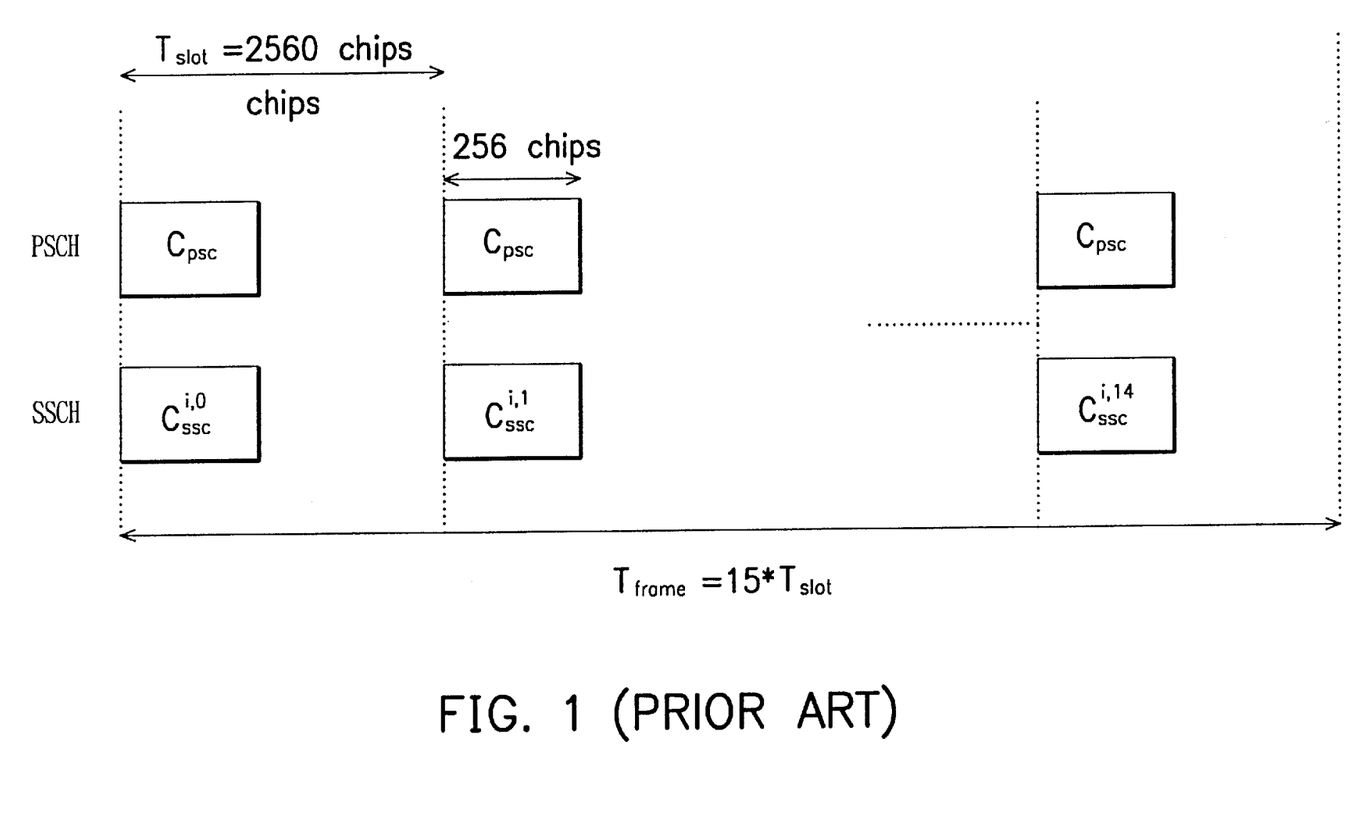
FIG. 1 illustrates the relationship of the primary and the secondary synchronization channels.
Figure 2B:
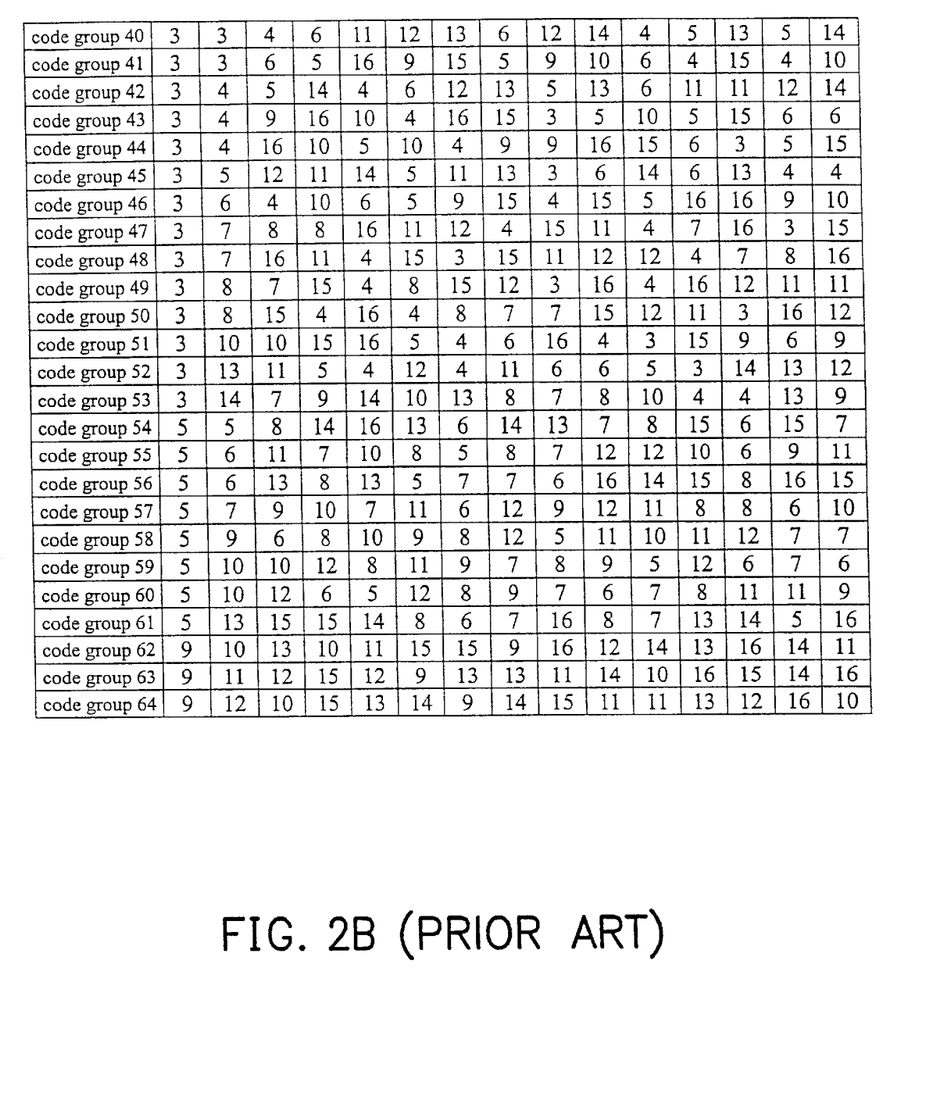
FIG. 2 shows the code allocation for a base station.

In asynchronous systems such as wide-band CDMA and 3GPP, each base station adopts two synchronization channels as shown in FIG. 1, such that a mobile terminal can establish the link and will not lose connection on hand-offs by acquiring the synchronization codes transmitted in synchronization channels. The first synchronization channel (primary synchronization channel, hereinafter PSCH) consists of an unmodulated primary synchronization code (denoted as $C_{psc}$) with length of 256 chips transmitted once every slot. $C_{psc}$ is the same for all base stations. This code is periodically transmitted such that it is time-aligned with the slot boundary of downlink channels as illustrated in FIG. 1. The second synchronization channel (secondary synchronization channel, hereinafter SSCH) consists of a sequence of 15 unmodulated secondary synchronization codes ($C_{ssc}^{i,1}$ to $C_{ssc}^{i,15}$) repeatedly transmitted in parallel with $C_{psc}$ in the PSCH. 15 secondary synchronization codes are sequentially transmitted once every frame. Each secondary synchronization code is chosen from a set of 16 different orthogonal codes of length 256 chips. This sequence on the SSCH corresponds to one of 64 different code groups the base station downlink scrambling code belongs to. The code allocation for a base station is shown in FIG. 2. These 64 sequences are constructed such that their cyclic-shifts are unique. In other words, if the count of cyclic-shifting is 0 to 14, all 960 (=64*15) possible sequences generated by cyclic-shifting the 64 sequences are different from each other. Base upon this property, cell search algorithms can be developed to uniquely determine both the code group and the frame timing.

During the initial cell search for the wide-band CDMA system proposed by 3GPP, a mobile station searches for the base station to which it has a lowest path loss. It then determines the downlink scrambling code and frame synchronization of the base station. This initial cell search is typically carried out in three steps:

Step 1: Slot Synchronization

During the first step of the initial cell search procedure, the mobile station searches for the base station to which it has lowest path loss via the primary synchronization code transmitted through the PSCH. This is typically done with a single matched filter matching to the primary synchronization code. Since the primary synchronization code is common to all the base stations, the power of the output signal of the matched filter should have peaks for each ray of each base station within a receivable range. The strongest peak corresponds to the most stable base station for linking. Detecting the position of the strongest peak yields the timing and the slot length that the strongest base station modulates. That is, this procedure causes the mobile station to acquire slot synchronization to the strongest base station.

Step 2: Frame Synchronization and Code-group Identification

During the second step of the cell search procedure, the mobile station utilizes the secondary synchronization code in the SSCH to find the frame synchronization and the code group of the cell found in the first step. Since the secondary synchronization code is transmitted in parallel with the primary synchronization code, the position of the secondary synchronization code can be found after the first step. The received signal at the positions of the secondary synchronization code is consequently correlated with all possible secondary synchronization codes for code identification. 15 consecutive codes received and identified within one frame construct a received sequence. Because the cycle shifts of the 64 sequences corresponding to 64 code groups are unique, by correlating the received sequence with the 960 possible sequences, the code group for the strongest base station as well as the frame synchronization is determined.

Step 3: Scrambling-code Identification

During the last step of the cell search procedure, the mobile terminal determines the exact primary scrambling code used by the found base station. The primary scrambling code is typically identified through symbol-to-symbol correlation over the Common Pilot Channel (hereinafter CPICH) with all codes within the code group identified in the second step. After the primary scrambling code has been identified, the Primary Common Control Physical Channel (hereinafter PCCPCH) can be detected. Then the system and cell specific information can be read.

In sum, the main tasks of the initial cell search procedure are to (1) search for a cell with the strongest received power, (2) determine frame synchronization and code group, and (3) determine the down-link scrambling code.

Figure 3:
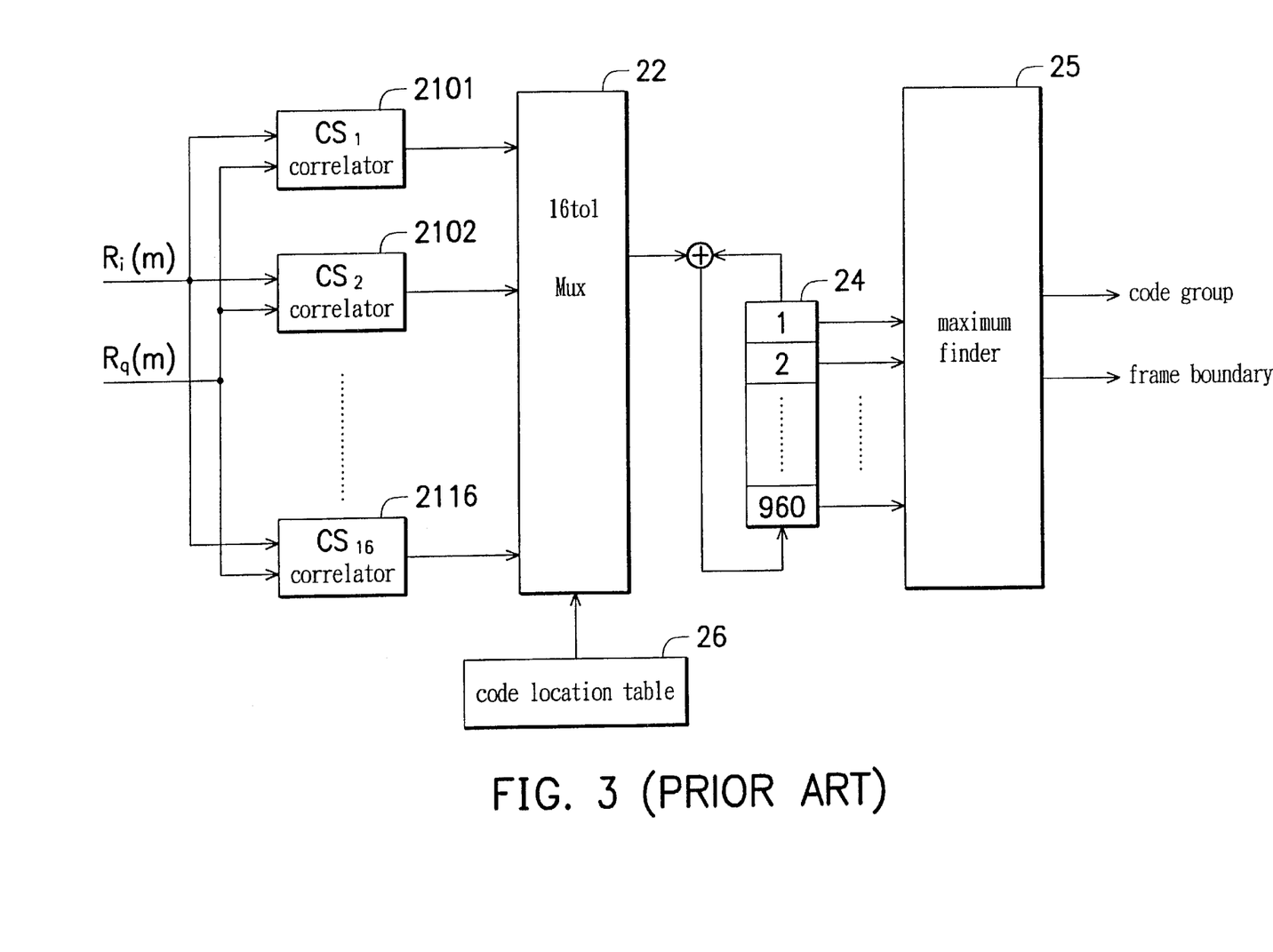
FIG. 3 demonstrates an intuitive implementation for code group identification and frame synchronization.

An intuitive implementation for code group identification and frame synchronization are illustrated in FIG. 3. $R_I(m)$ and $R_q(m)$ are signals demodulated by QPSK (quaternary phase shift keying) with phase difference of $\pi/2$. 16 correlators 2101~2116 correlate $R_I(m)$ and $R_q(m)$ received in a slot with different correlation co-efficiencies, respectively, to determine the similarities for the representation of $R_I(m)$ and $R_q(m)$ to 16 orthogonal codes $CS_1$ to $CS_{16}$. A code location table 26 records the 64 code groups in FIG. 2, totaling 960 secondary synchronization codes. The code location table 26 sequentially provides the stored secondary synchronization codes. For example, in a first time slot, the code location table 26 sends out the 960 secondary synchronization codes from the codes in column 1 to the codes in column 15. In a next time slot, the code location table 26 sends out the 960 secondary synchronization codes from the codes in column 2 to the codes in column 15 and back to codes in column 1, etc. It is emphasized that the output sequence from the code location table 26 is slot-dependent. The 16-to-1 multiplexor passes one of the 16 similarities from the correlators, according to the secondary synchronous code it received, to one of the 960 shift registers 24. 960 shift registers 24 store the 16 similarities within a slot, and accumulate the similarities from slot to slot. After accumulating within a frame (15 slots), a maximum finder 25 can find one of the 960 shift registers 24 having a highest similarity and determines the frame boundary and the code group.

SUMMARY OF THE INVENTION

Therefore, an object of the present invention is to provide an apparatus and method for efficient code group identification and frame synchronization.

To achieve the aforementioned purpose, the present invention provides a method for code group identification and frame synchronization. The first step of the method is providing secondary synchronization code sequences $SSCS_1$, $SSCS_2$, ..., $SSCS_K$ with length of L codes. The secondary synchronization code sequences $SSCS_1$, $SSCS_2$, ..., $SSCS_K$ are corresponding to code groups $GCS_1$, $GCS_2$, ..., $GCS_k$ and constructed of $CS_1$, $CS_2$, ..., $CS_N$. Then, the method according to the present invention has a step of providing K theoretical frequency sequences with length of N elements. Each theoretical frequency sequence represents the theoretical-occurrence times of $CS_1$, $CS_2$, ..., $CS_N$ in a corresponding secondary synchronization code sequence. Then, the method has a step of sensing and recording, consecutively, secondary synchronization codes from a base station to form a received code sequence with length of L codes, each code in the received code sequence being selected from $CS_1$, $CS_2$, ..., $CS_N$. The following step is counting the occurrence times of $CS_1$, $CS_2$, ..., $CS_N$ in the received code sequence to form a testing sequence with length of N elements. Then the method has a step of comparing, one-by-one, the testing sequence with the K theoretical frequency sequences to retrieve a candidate code group, wherein the theoretical frequency sequence corresponding to the candidate code group is most similar to the testing sequence. The candidate code group corresponds to a candidate secondary synchronization code sequence. Then the method has a step of comparing the received code sequence with all possible sequences generated by cycle-shifting the candidate secondary synchronization code sequence to retrieve a most-likely code sequence which is most similar to the received code sequence. The final step of the method is determining a code group and a frame boundary according to the most-likely sequence.

Another aspect of the present invention is providing an apparatus for code group identification and frame synchronization. The apparatus according to the present invention is applied to a DS-CDMA communication system, and comprises a first memory set, a second memory set, a receiver, a summation unit, a group searcher and a frame alignment unit. The first memory set stores secondary synchronization code sequences $SSCS_1$, $SSCS_2$, ..., $SSCS_K$ with length of L codes. The secondary synchronization code sequences $SSCS_1$, $SSCS_2$, ..., $SSCS_K$ correspond to code groups $GCS_1$, $GCS_2$, ..., $GCS_k$ and are constructed of $CS_1$, $CS_2$, ..., $CS_N$. The second memory set records K theoretical frequency sequences with length of N elements, each theoretical frequency sequence representing the theoretical-occurrence times of $CS_1$, $CS_2$, ..., $CS_N$ in a corresponding secondary synchronization code sequence. The receiver receives and extracts secondary synchronization codes transmitted from a base station in an observation frame to form a received code sequence with length of L codes. Each code in the received code sequence is selected from $CS_1$, $CS_2$, ..., $CS_N$. The summation unit counts the occurrence times of $CS_1$, $CS_2$, ..., $CS_N$ in the received code sequence to form a testing sequence with length of N elements. The group searcher compares, one-by-one, the testing sequence with the K theoretical frequency sequences to retrieve a candidate code group, wherein the candidate code group corresponds to a most-likely theoretical frequency sequence which is most similar to the testing sequence. The candidate code group also corresponds to a candidate secondary synchronization code sequence. The frame alignment unit compares the received code sequence with all possible sequences generated by cycle-shifting the candidate secondary synchronization code sequence to retrieve a most-likely code sequence which is most similar to the received code sequence. Thereby, the frame alignment unit determines a code group and a frame boundary according to the most-likely sequence.

The advantage of the present invention is it increases the speed for code group identification and frame synchronization. The candidate code group can be quickly obtained by comparing the testing sequence with the K theoretical frequency sequences. Thereby, frame synchronization can be easily achieved by comparing the received code sequence with all the possible secondary synchronization code sequences relative to the candidate code group.

BRIEF DESCRIPTION OF THE DRAWINGS

The drawings referred to herein will be understood as not being drawn to scale except if specially noted, the emphasis instead being placed upon illustrating the principles of the present invention. In the accompanying drawings.

DETAILED DESCRIPTION OF THE PREFERRED EMBODIMENT

The present invention provides a method and apparatus for code group identification and frame synchronization. The spirit of the present invention is characterizing the 64 secondary synchronization code sequences (SSCSs) corresponding to the 64 code groups with 64 features prior to executing a comparison. In the embodiment below, each feature for a corresponding SSCS is the representation of the occurrence times of $CS_1$ to $CS_{16}$ in the corresponding SSCS. Such a feature of the SSCS transmitted by a base station can also be recognized to exclude most of the SSCSs of the 64 code groups from comparison. That means, very few of the 64 SSCSs having the similar feature with that of the base station are needed to execute the comparison for code identification and frame synchronization. Therefore, the speed for identification and synchronization can be increased.

Figure 4:
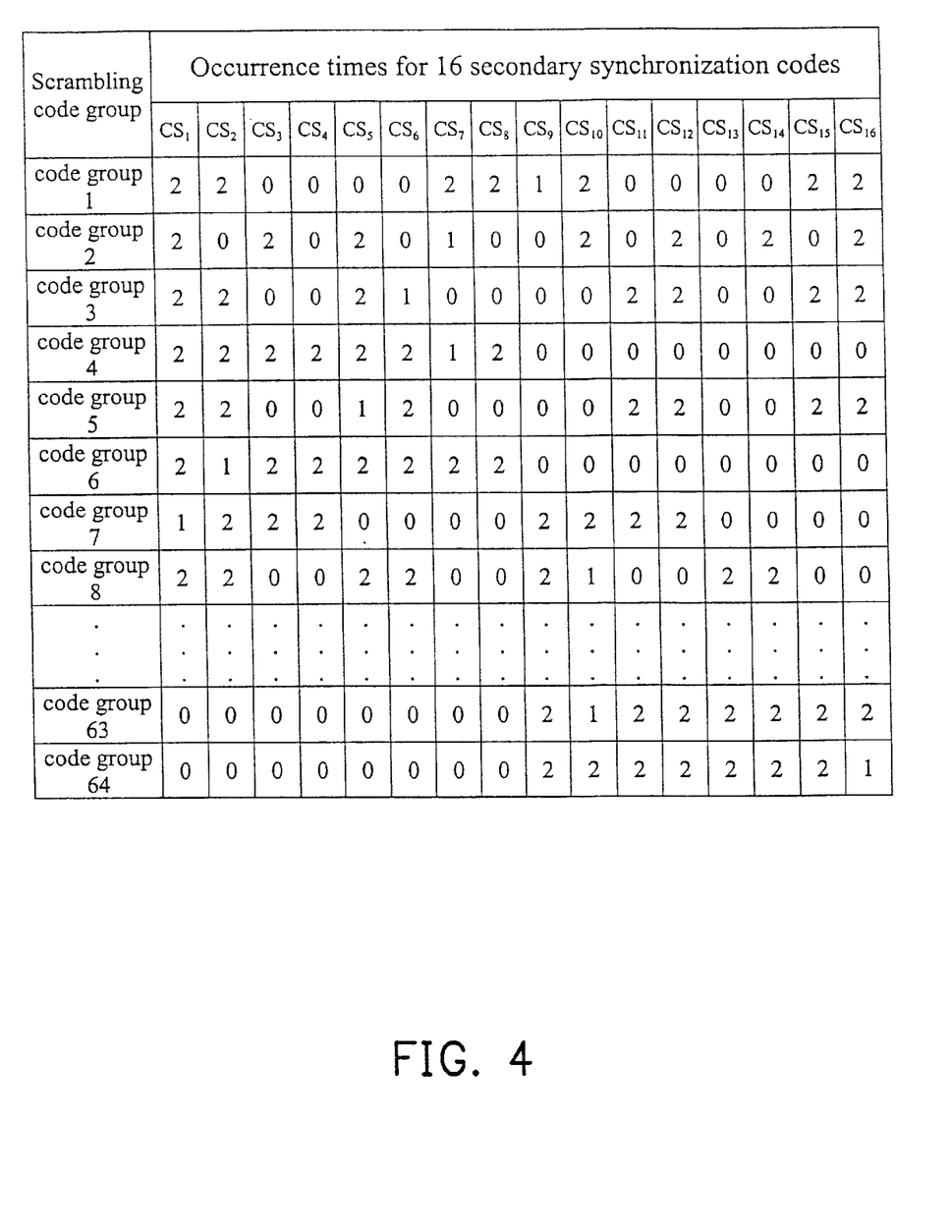
FIG. 4 is a provisional diagram for a table illustrating the occurrence times of the secondary synchronization codes ($CS_1$ to $CS_{16}$) in a relative SSCS.

FIG. 4 is a provisional diagram for a table illustrating the occurrence times of the secondary synchronization codes ($CS_1$ to $CS_{16}$) in a relative SSCS. The table in FIG. 4 is generated from the table in FIG. 2. Every row in the table of FIG. 4 shows the occurrence times of $CS_1$ to $CS_{16}$ in the SSCS of a corresponding code group. It is illustrated in FIG. 2 that $CS_1$ and $CS_2$ each appear two times and $CS_3$ doesn't appear in the SSCS of code group 1. Thus the theoretical frequency sequence for code group 1, which is shown in the row 1 of FIG. 4, is (2, 2, 0, . . . ). Following the same concept, each theoretical frequency sequence for each code group can be determined. The result is shown in FIG. 4. FIG. 4 also illustrates one important point, which is that, at most, two theoretical frequency sequences among these 64 theoretical frequency sequences are identical. Thus, if one can find out a real frequency sequence relative to the SSCS transmitted by a base station, such a real frequency sequence can be used as a criterion to filter out the code groups having totally different theoretical frequency sequences as the real frequency sequence.

Figure 5:
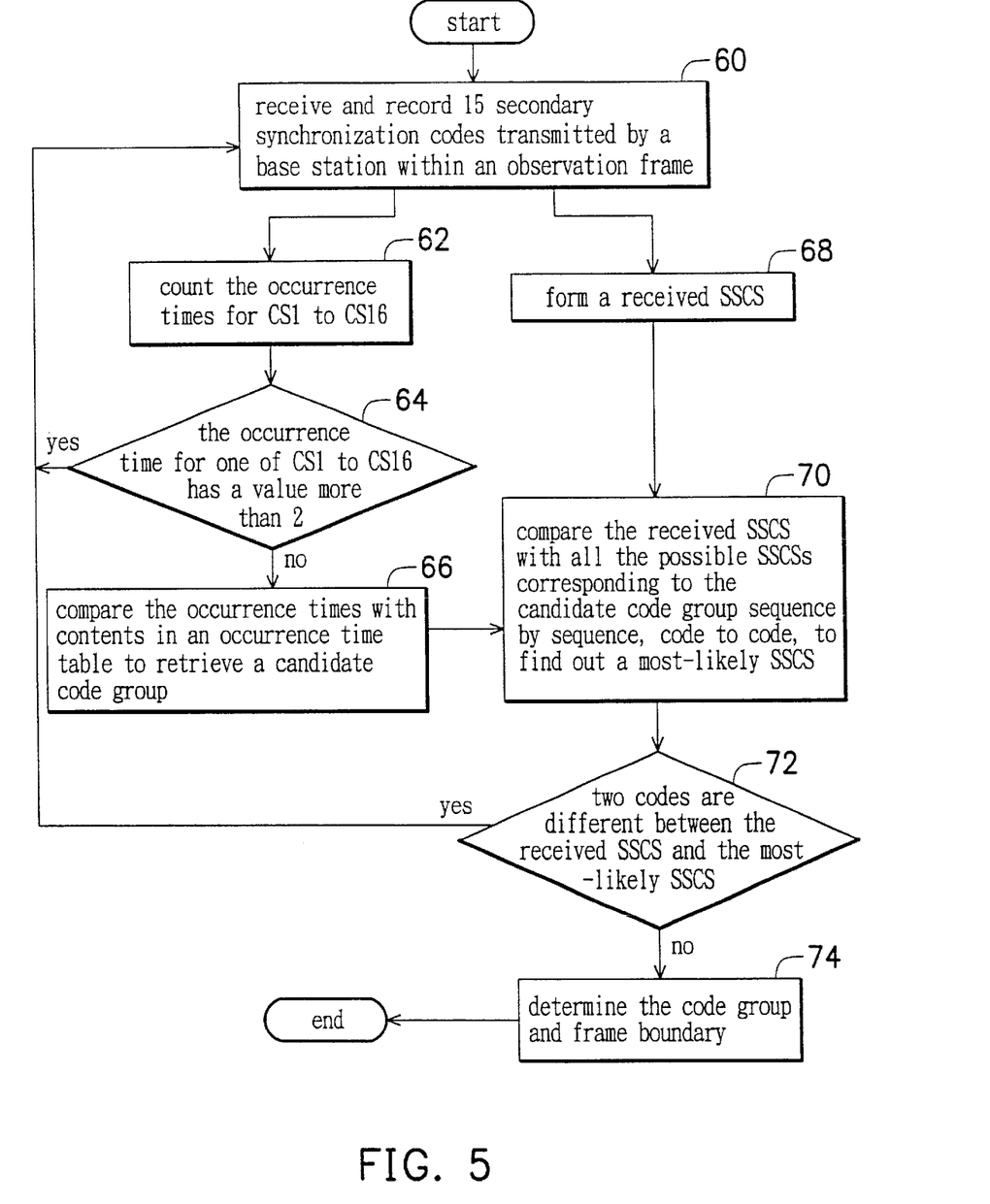
FIG. 5 is a flow chart for a mobile terminal to identify code group and synchronize time frame according to the present invention.

FIG. 5 is a flow chart for a mobile terminal to identify code group and synchronize time frame according to the present invention. First, a mobile terminal, e.g. a cellular phone, receives and records the secondary synchronization codes transmitted in an observation frame by a base station (60). These codes form a received SSCS with length of 15 codes (68). During forming the received SSCS, the occurrence times of $CS_1$ to $CS_{16}$ can also be determined to form a testing sequence with length of 16 elements (62). From FIG. 4, it is known that each secondary synchronization code happens in an SSCS no more than two times. Thus, if the testing sequence has an element with a value greater than 2 (Yes route in symbol 64), another observation frame are required to generate a newborn receive SSCS since there are too many errors in the original receive SSCS. When all elements in the testing sequence have values less than or equal to 2 (No route in symbol 64), by comparing the testing sequence with the table shown in FIG. 4, at least one most-likely theoretical frequency sequence, which is most similar to the testing sequence, can be determined (66). A most-likely theoretical frequency sequence corresponds to a candidate code group. Then, by comparing the received SSCS with all the possible SSCSs generated by cycle shifting the SSCS relative to the candidate code group(s), a most-likely SSCS among those cycle-shifted SSCSs can be determined (70). If there are more than 2 codes being different between the most-likely SSCS and the received SSCS (Yes in symbol 72), it means there are too many errors, so that an overall re-execution of this method is conducted. If the differences between the most-likely SSCS and the received SSCS are not more than two codes (No in symbol 72), the code group and the frame boundary can be determined by the most-likely SSCS.

Figure 6:
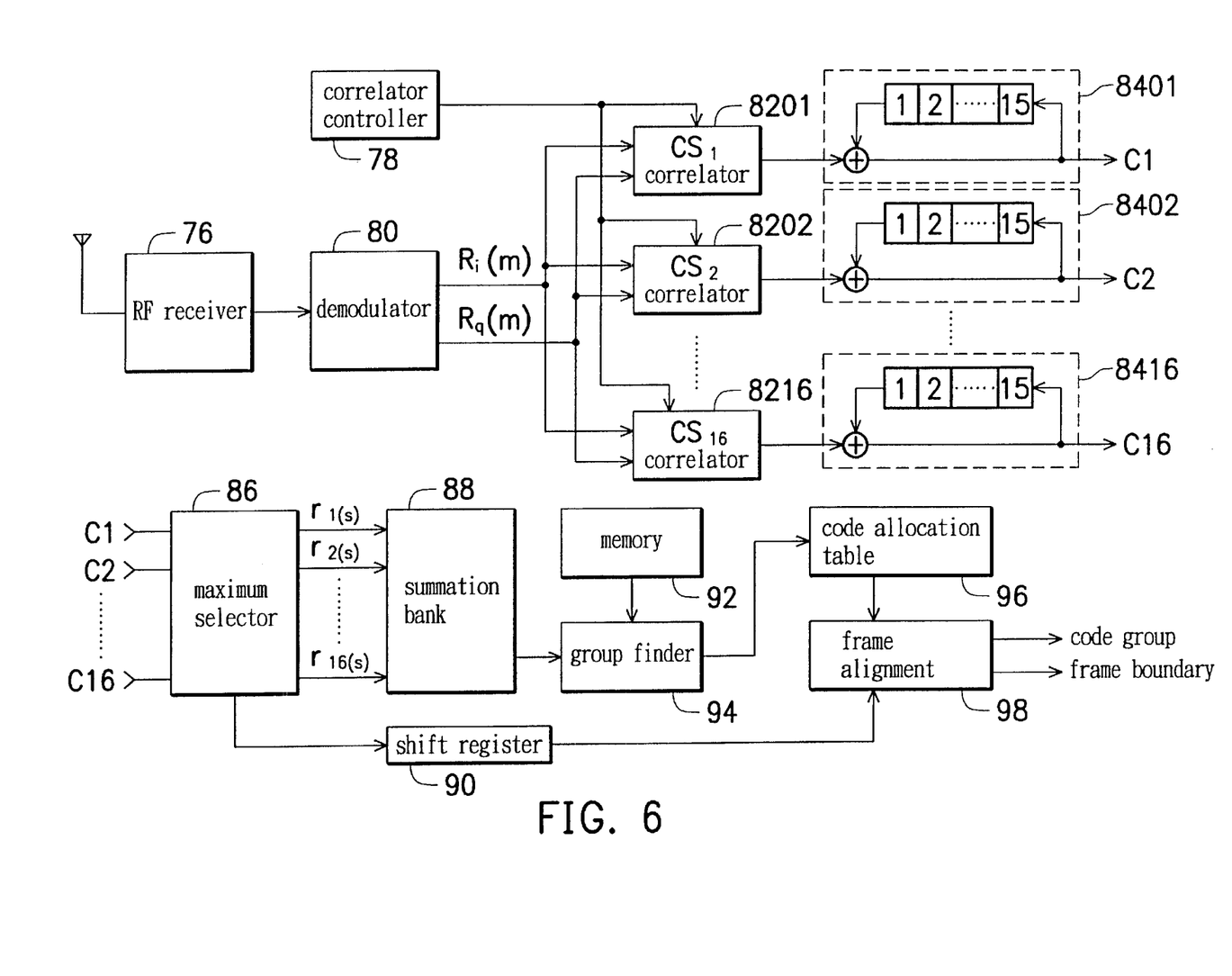
FIG. 6 shows an apparatus according to the present invention.

FIG. 6 shows an apparatus according to the present invention. A RF (radio frequency) receiver 76 transforms spread spectrum signal received by an antenna to intermediate frequency signals. A demodulator 80 demodulates and samples the intermediate frequency signals, and outputs in-phase samples $R_i(t)$ and quadrature-phase samples $R_q(t)$ A correlator controller 78 supplies the correlation coefficients to a matched correlator bank, in which a predefined number of correlators 8201–8216 correspond to the secondary synchronization codes $CS_1$ to $CS_{16}$. The correlator controller 78 enables the correlators 8201–8216 to correlate in-phase samples $R_i(t)$ and quadrature-phase samples $R_q(t)$ at the start-up position of each slot for 256 chip period, and the correlators 8201–8216 will produce the output power level, respectively. Each output power level represents the similarity level to a corresponding secondary synchronization code for the in-phase samples $R_i(t)$ and quadrature-phase samples $R_q(t)$ within a slot. These output power levels are then sent into a frame-wise accumulator bank with 16 frame-wise accumulators 8401–8416. Each frame-wise accumulator 84n(n is an integer within [1,16] consists of an adder 40n and a shift register 42n of fifteen words, as shown in FIG. 6. Since a frame has fifteen slots in the synchronization channel, the output power levels for a given slot in consecutive observation frames can be summed together frame by frame for reliable decision of code group.

After the frame-wise accumulator bank performs accumulation over a plurality of consecutive observation frames, the frame-wise accumulator 84n has fifteen summed output power levels in the shift register 42n. These contents of the shift register 42n are in parallel shifted out to a maximum selector 86 one by one. The maximum selector 86 then determines which has the maximum power among 16 accumulated power levels C1 to C16. Assuming that the content of the shift register 42n at the sth word has the largest accumulated power level among those of the shift registers 4201–4216 at sth word (s is an integer within [1, 15]), the output signal $r_n(s)$ is 1, while the other output signals $r_m(s)$, m≠n, are set as 0. At the same time, $CS_n(s)$, the most-likely secondary synchronization code in a given slot, is sent to a shift register 90 of fifteen words. Therefore, the shift register 90 restores 15 most-likely secondary synchronization codes, transmitted by a base station and detected within an observation frame, to construct a detected code sequence.

Figure 7:
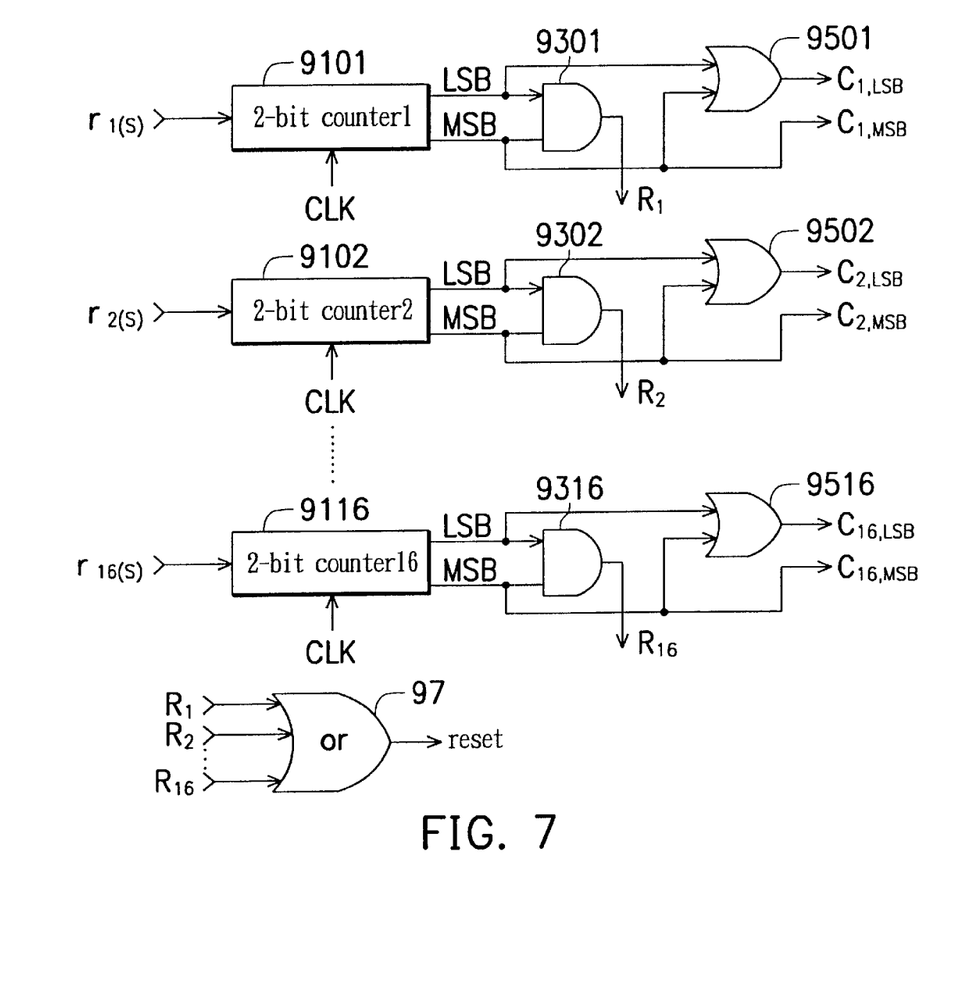
FIG. 7 illustrates an implementation for the summation bank in FIG. 6.

The output signal $r_n(S)$ is sent to a summation bank 88 for counting the occurrence times of each secondary synchronization code. Since the output signal $r_n(S)$ from the maximum selector 86 is either 1 or 0, the summation bank 88 can be implemented by 2-bit counters 9101–9116. Each counter is either enabled for incrementing or disabled for holding the present count. The implementation for the summation bank 88 is shown in FIG. 7. The process keeps going for fifteen iterations until the content of each shift register are serially shifted out. After the fifteen contents of each shift register 42n are all passed through the summation bank 88, the count of the nth counter 91n in the summation bank 88 represents the occurrence times when the matched correlator 82n has the maximal output power level within one observation frame. That is, if the communication environment was noiseless and interference-free, the contents of the nth counter 91n exactly represent the occurrence times of the secondary synchronization code $CS_n$ used within one frame. Utilizing this property, a mobile terminal can determine the code group that is used by the base station synchronized to the mobile terminal. As shown in FIG. 4, the occurrence time for each secondary synchronization code $CS_n$ within an observation frame is no more than 2. Therefore, 16 "and gates" 9301–9316 and "or gate" 97 are used for resetting all the system when one of the 16 occurrence times respectively for the 16 secondary synchronization codes is higher than 2. The contents of the counters 9101–9116 are encoded as

Figure 9:
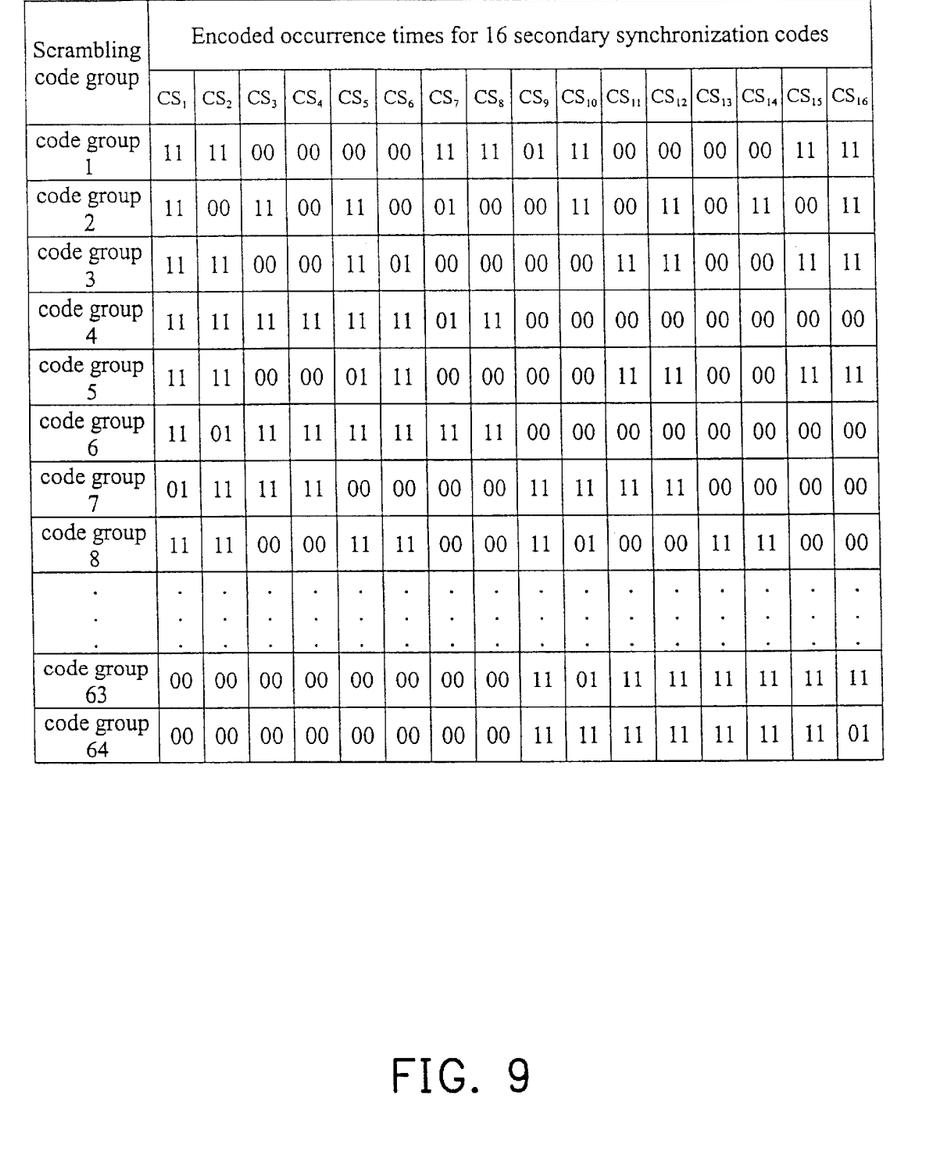
FIG. 9 illustrates a group decision table generated by transforming the table in FIG. 4.

0→00,

1→01,

2→11, and collected into a sequence, called a test sequence. The test sequence consists of $C_{1,LSB}$, $C_{1,MSB}$, ..., $C_{16,LSB}$, $C_{16,MSB}$. Following the above encoding rule, one can obtain the group decision table shown in FIG. 9 by transforming the table in FIG. 4. The group decision table is saved in the memory 92 in FIG. 6. The kth row of the group decision table shown in FIG. 9 is an ideal sequence $T_k$ (k is an integer within [1, 64]), which represents the occurrence times of $CS_1$ to $CS_{16}$ for the kth code group within one frame at an ideal (no noise) condition.

Figure 8:
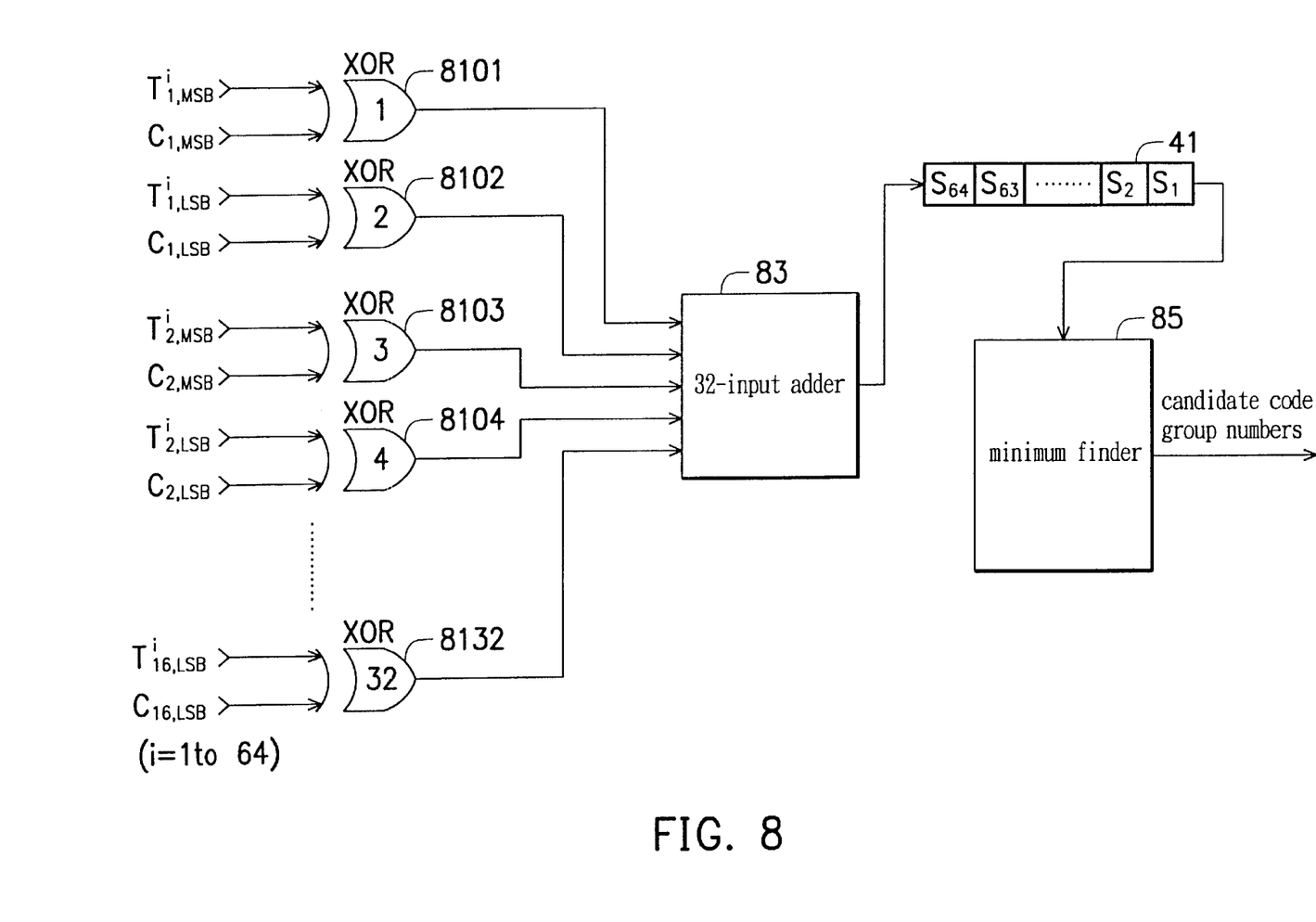
FIG. 8 illustrates a schematic diagram of the group finder in FIG. 6.

By comparing the test sequence with the ideal sequences $T_1$ to $T_{64}$ in the group decision table row by row, the code group number can be discriminated. At most two ideal sequences yield the best similarity and are called candidate sequences. These two candidate sequences, for example, corresponding to the two possible code groups, may be used by the base station synchronized to the mobile terminal. A group finder 94 shown in FIG. 6 executes such code group discrimination. FIG. 8 illustrates a schematic diagram of the group finder in FIG. 6. 32 2-input XOR (exclusive or) logic gates 8101–8132 are used to in parallel to compare the bits in the test sequence with those in an ideal sequence $T_k$ bit by bit. A 2-input XOR logic gate 81*h* (h is an integer within [1, 32]) has an output signal of "0" when its two inputs are of the same value, and "1" for other conditions. A 32-input adder-83 accumulates the output signals of the 2-input XOR logic gates 8101–8132 to obtain a similarity value $S_k$ corresponding to an ideal sequence $T_k$. 64-similarity values $S_1$ to $S_{64}$ are sequentially stored in a shift register 42. The smaller the value of $S_k$ the more similarity between the test sequence and the ideal sequence $T_k$. A minimum finder 85 finds out the least two similar values among $S_1$ to $S_{64}$ and outputs two candidate code group numbers.

Figure 10:
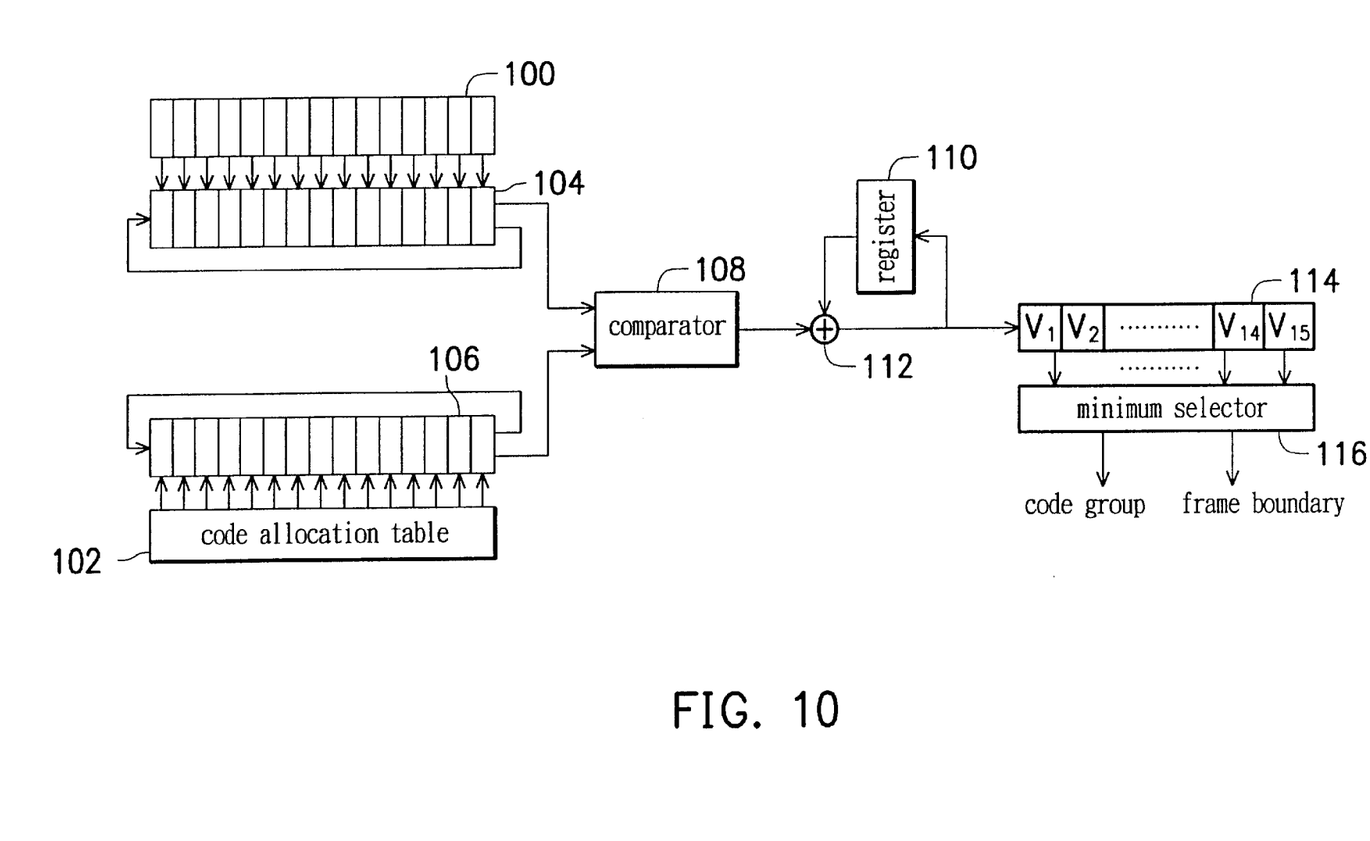
FIG. 10 illustrates a schematic diagram of the frame alignment unit in FIG. 6.

The code allocation table 96 in FIG. 6 stores the 64 secondary synchronization code sequences corresponding to the 64 code groups, and outputs two candidate SSCSs corresponding to the two candidate code group numbers obtained from the minimum finder 85. A frame alignment unit 98 compares the detected code sequence in the shift register 90 with all possible secondary synchronization code sequences generated by cycle-shifting the two candidate SSCSs to determine the exact code group number and the accurate frame boundary. FIG. 10 illustrates a schematic diagram of the frame alignment unit in FIG. 6. The code indexes of the detected code sequence in the shift register 90 are in parallel shifted out to the shift register 104. One possible code sequence formed by cycle shifting one candidate SSCS is stored in the shift register 106. The code indexes at the same positions of the shift registers 104 and 106 are in parallel shifted out as two inputs of the comparator 108. The output of the comparator 108 has an output signal of "0" when the two input are of the same value, and "1" for other conditions. A register 108 and an adder 112 summarize the 15 output results and output a corresponding summation to a shift register 114. A SSCS relative to a candidate code group can generate 15 possible cycle-shifted SSCSs, to which 15 summations $V_1$ to $V_{15}$ stored in shift register 114 are corresponding. If there are two candidate code groups, the shift register 114 must store 30 summations since there are 30 possible cycle-shifted SSCSs. The smaller a summation, the more similar between a corresponding cycle-shifted SSCS and the detected code sequence. The minimum selector 116 retrieves the smallest among the summations in the shift register 114 to determine the code group employed by the synchronized base state and the frame boundary.

By employing the method provided by the present invention, the huge task of comparing the detected code sequence with the 960 possible cycle-shifted SSCSs corresponding to the 64 code groups can be avoid. There are at most two candidate code groups after comparing the occurrence times of the secondary synchronization codes for the detected code sequence with those for the 64 SSCSs. Therefore, fewer tasks are needed to determine code group and frame synchronization by taking reference of the two candidate code groups. Thereby, the processing rate can be speed up.

While the invention has been described by way of example and in terms of the preferred embodiment, it is to be understood that the invention is not limited to the disclosed embodiment. On the contrary, it is intended to cover various modifications and similar arrangements as would be apparent to those skilled in the art. Similarly, any process steps described herein may be interchangeable with other steps in order to achieve the same result. Therefore, the scope of the appended claims should be accorded the broadest interpretation so as to encompass all such modifications and similar arrangements, which is defined by the following claims and their equivalents.

What is claimed is:

1. A method for code group identification and frame synchronization, comprising the following steps:

providing secondary synchronization code sequences $SSCS_1$, $SSCS_2$, ..., $SSCS_K$ with length of L codes, secondary synchronization code sequences $SSCS_1$, $SSCS_2$, ..., $SSCS_K$ corresponding to code groups $GCS_1$, $GCS_2$, ..., $GCS_k$ and constructed of $CS_1$, $CS_2$, ..., $CS_N$;

providing K theoretical frequency sequences with length of N elements, each theoretical frequency sequence representing the theoretical-occurrence times of $CS_1$, $CS_2$, ..., $CS_N$ in a corresponding secondary synchronization code sequence, wherein K, L, and N are integers;

sensing and recording, consecutively, secondary synchronization codes from a base station to form a received code sequence with length of L codes, each code in the received code sequence being selected from $CS_1$, $CS_2$, ..., $CS_N$;

counting the occurrence times of $CS_1$, $CS_2$, ..., $CS_N$ in the received code sequence to form a testing sequence with length of N elements;

comparing, one-by-one, the testing sequence with the K theoretical frequency sequences to retrieve a candidate code group, wherein the theoretical frequency sequence corresponding to the candidate code group is most similar to the testing sequence, the candidate code group corresponding to a candidate secondary synchronization code sequence;

comparing the received code sequence with all possible sequences generated by cycle-shifting the candidate secondary synchronization code sequence to retrieve a most-likely code sequence which is most similar to the received code sequence; and determining a code group and a frame boundary according to the most-likely sequence.

2. The method as claimed in claim 1, further comprising a step of consecutively re-sensing and recording secondary synchronization codes from the base station to replace the received code sequence when one of $CS_1, CS_2, \ldots, CS_N$, in the received code sequence has an occurrence time more than 2.

3. The method as claimed in claim 1, wherein the number of candidate code groups is not more than 2.

4. The method as claimed in claim 1, further comprising a step of consecutively re-sensing and recording secondary synchronization codes from the base station to replace the received code sequence when the received code sequence and the most-likely sequence have different codes at two corresponding places.

5. The method as claimed in claim 1, wherein the method is employed in a direct-sequence code division multiple code access (DS-CDMA) communication system.

6. A apparatus for code group identification and frame synchronization, applied for a DS-CDMA communication system, comprising:
- a first memory set for storing secondary synchronization code sequences $SSCS_1, SSCS_2, \ldots, SSCS_K$ with length of L codes, secondary synchronization code sequences $SSCS_1, SSCS_2, \ldots, SSCS_K$ corresponding to code groups $GCS_1, GCS_2, \ldots, GCS_k$ and constructed of $CS_1, CS_2, \ldots, CS_N$;
- a second memory set for recording K theoretical frequency sequences with length of N elements, each theoretical frequency sequence representing the theoretical-occurrence times of $CS_1, CS_2, \ldots, CS_N$ in a corresponding secondary synchronization code sequence, wherein K, L, and N are integers;
- a receiver for receiving and extracting secondary synchronization codes transmitted from a base station in an observation frame to form a received code sequence with length of L codes, each code in the received code sequence being selected from $CS_1, CS_2, \ldots, CS_N$;
- a summation unit for counting the occurrence times of $CS_1, CS_2, \ldots, CS_N$ in the received code sequence to form a testing sequence with length of N elements;
- a group searcher for comparing, one-by-one, the testing sequence with the K theoretical frequency sequences to retrieve a candidate code group, wherein the candidate code group corresponds to a most-likely theoretical frequency sequence which is most similar to the testing sequence and corresponding to a candidate secondary synchronization code sequence; and
- a frame alignment unit for comparing the received code sequence with all possible sequences generated by cycle-shifting the candidate secondary synchronization code sequence to retrieve a most-likely code sequence which is most similar to the received code sequence and determining a code group and a frame boundary according to the most-likely sequence.

7. The apparatus as claimed in claim 6, wherein the receiver comprises:
- a radio frequency (RF) receiver for transforming spread signals transmitted from the base station to intermediate signals;
- a demodulator for demodulating and sampling the intermediate signals in each slot to generate an in-phase signal and a quadrature-phase signal;
- N matched correlators for correlating the in-phase signal and the quadrature-phase signal according to N different coefficient sets and respectively generating N output power levels in each slot, N coefficient sets respectively corresponding to $CS_1, CS_2, \ldots, CS_N$;
- N frame-wise accumulators, each frame-wise accumulator periodically accumulating output power levels from a corresponding matched correlator with a period of a frame and outputting a summation power level for each slot;
- a maximum selector for, in each slot, finding a maximum power level among N summation power levels from N frame-wise accumulators and correspondingly outputting a retrieved secondary synchronization code among $CS_1, CS_2, \ldots, CS_N$, the retrieved secondary synchronization code being the most possible secondary synchronization code received in a corresponding slot; and
- a recorder for consecutively recording L retrieved secondary synchronization codes from the maximum selector in a frame to form the received code sequence.

* * * * *